No. 783,443. PATENTED FEB. 28, 1905.
W. H. LESTER.
BAG TURNING MACHINE.
APPLICATION FILED APR. 25, 1904.

ATTEST,
Alfred A. Eur
Edw M. Harrington

INVENTOR,
WM. H. LESTER.
BY Higdon, Longan & Hopkins
ATTYS.

No. 783,443. PATENTED FEB. 28, 1905.
W. H. LESTER.
BAG TURNING MACHINE.
APPLICATION FILED APR. 25, 1904.

ATTEST.
Alfred A. Eric
Edw. M. Harrington

INVENTOR.
WM. H. LESTER,
By Higdon, Longan & Hopkins.
ATTYS.

No. 783,443. PATENTED FEB. 28, 1905.
W. H. LESTER.
BAG TURNING MACHINE.
APPLICATION FILED APR. 25, 1904.

ATTEST:
Alfred A. Lewis
Edw M Harrington

INVENTOR,
WM. H. LESTER.
By Higdon, Longan & Hopkins.
ATTYS.

No. 783,443. PATENTED FEB. 28, 1905.
W. H. LESTER.
BAG TURNING MACHINE.
APPLICATION FILED APR. 25, 1904.

ATTEST,
Alfred O. Evers
Edw. M. Harrington

INVENTOR,
WM. H. LESTER.
BY Higdon, Longan & Hopkins.
ATTYS.

No. 783,443. PATENTED FEB. 28, 1905.
W. H. LESTER.
BAG TURNING MACHINE.
APPLICATION FILED APR. 25, 1904.

ATTEST,
Alfred A Lewis
Edw M Harrington

INVENTOR,
WM. H. LESTER.
By Higdon, Longan & Hopkins.
ATTYS.

No. 783,443. PATENTED FEB. 28, 1905.
W. H. LESTER.
BAG TURNING MACHINE.
APPLICATION FILED APR. 25, 1904.

ATTEST,
Alfred A. Eicks
Edw M Harrington

INVENTOR.
WM. H. LESTER.
By Higdon, Longan & Hopkins.
ATTYS.

No. 783,443. PATENTED FEB. 28, 1905.
W. H. LESTER.
BAG TURNING MACHINE.
APPLICATION FILED APR. 25, 1904.

ATTEST,
Alfred A Eicks
Edw M Harrington

INVENTOR.
WM. H. LESTER.

BY Higdon & Longan & Hopkins.
ATTYS.

No. 783,443. Patented February 28, 1905.

UNITED STATES PATENT OFFICE.

WILLIAM H. LESTER, OF ST. LOUIS, MISSOURI, ASSIGNOR TO BEMIS BROS. BAG CO., OF ST. LOUIS, MISSOURI.

BAG-TURNING MACHINE.

SPECIFICATION forming part of Letters Patent No. 783,443, dated February 28, 1905.

Application filed April 25, 1904. Serial No. 204,397.

*To all whom it may concern:*

Be it known that I, WILLIAM H. LESTER, a citizen of the United States, and a resident of St. Louis, Missouri, have invented certain new and useful Improvements in Rotary Pneumatic Bag-Turning Machines, of which the following is a specification containing a full, clear, and exact description, reference being had to the accompanying drawings, forming a part hereof.

My invention relates to rotary pneumatic bag-turning machines, and comprises the novel features herein shown, described, and claimed.

My object is to construct a bag-turning machine having means of establishing a continuous air-current, means of inserting the unturned bag into the path of the air-current so that the bag will be turned, and means of delivering the turned bags.

My invention comprises a rotary cylinder having a port in its periphery, means of establishing a continuous air-current toward said port, means of inserting the bag into the path of said air-current, and means of delivering the turned bag.

My invention further comprises a rotary cylinder having a port in its periphery, means of establishing a continuous air-pressure toward said port, means of turning the bag, and means of bringing the turned bag under the influence of said air-pressure.

My improved bag-turning machine as shown comprises a bag-turning suction-pipe having an inlet-port, a bag-delivery suction-pipe having an inlet-port, a suction-fan connected to said suction-pipes, a bag-turning cylinder rotatably mounted upon the bag-turning suction-pipe and having an inlet-port to register with the inlet-port of the suction-pipe at each revolution of the cylinder and to receive the closed end of the turned bag, a bag-delivery cylinder rotatably mounted in apposition to the bag-turning cylinder and upon the bag-delivery suction-pipe and having a port registering with the port of the suction-pipe at each revolution and having a pressure-distributing grate in said port, said cylinders being rotated nearly in peripheral contact, so that the turned bag may pass between the cylinders, a bag-turning box having a receiving-opening at its forward end and having its discharge end forming a close joint with both of said cylinders and communicating with the inlet-port of the bag-turning cylinder when said port registers with the port in the suction-pipe, there being a plurality of interchangeable forward end portions for said bag-turning box, bag-opening fingers mounted adjacent to the receiving-opening of said box, means of operating said fingers, means of intermittently rotating the bag-turning suction-pipe, so as to open and close the suction-ports quickly, means of rotatably adjusting the bag-delivery suction-pipe, so as to deliver bags of different lengths, means of yieldingly mounting one cylinder relative to the other, and a scraper in position to remove the bag from the delivery-cylinder.

Figure 1:
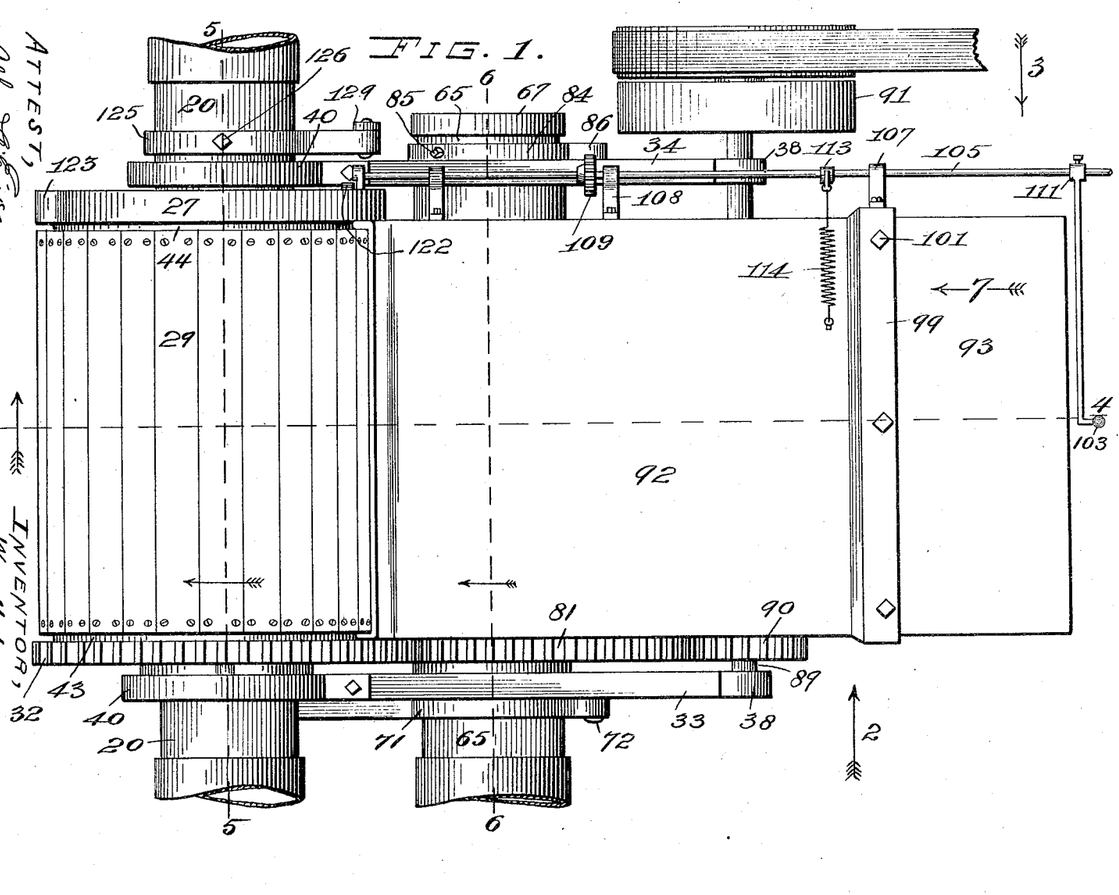
Figure 1 is a top plan view of a rotary pneumatic bag-turning machine embodying the principles of my invention as seen looking in the direction indicated by the arrows 1 in Figs. 2, 3, and 4.
Figure 2:
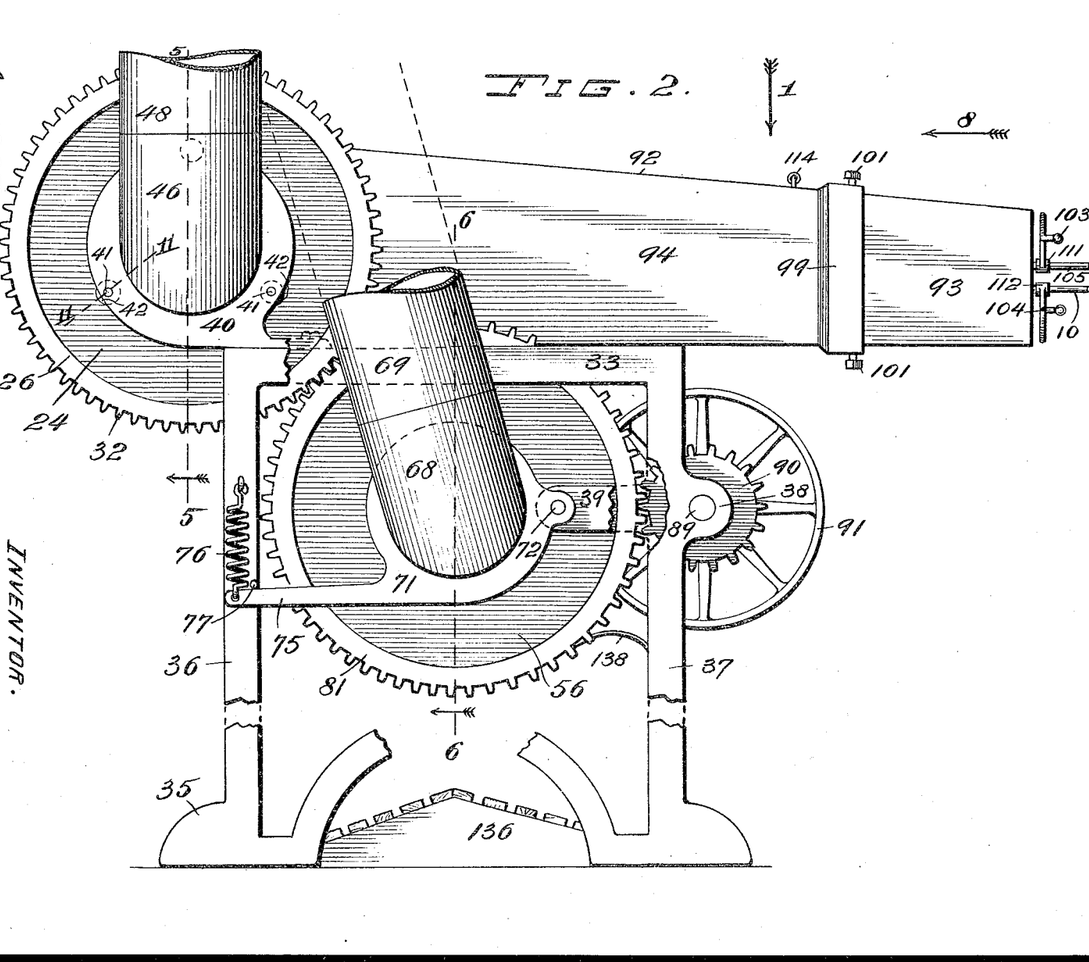
Fig. 2 is a side elevation as seen looking in the direction indicated by the arrow 2 in Fig. 1.
Figure 5:
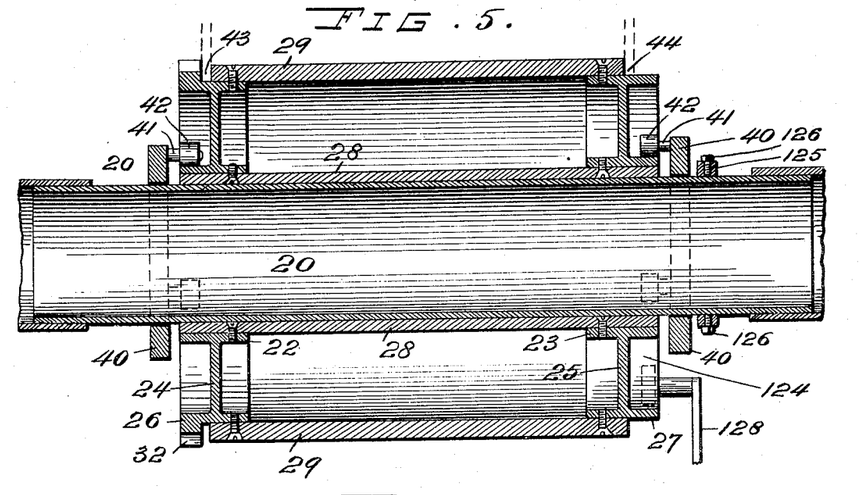
Fig. 5 is a cross-section on the lines 5 5 of Figs. 1, 2, and 3.

Referring to the drawings in detail, the section 20 of the bag-turning suction-pipe is straight from one end to the other and long enough to extend entirely through the machine, as shown in Figs. 1 and 5. The inlet-port 21 is located through the wall of the suction-pipe 20, the width of the inlet-port being about one-tenth of the diameter of the pipe and the length of the port being slightly more than one-half of the length of the pipe.

The bag-turning cylinder comprises the inner circular rims 22 and 23, the webs 24 and 25, extending outwardly from the rims at their transverse centers, the outer rims 26 and 27 at the outer edges of the webs 24 and 25, the inner barrel 28, connecting the rims 22 and 23 and fitting closely around the pipe 20, the outer barrel 29, connecting the rims 26 and 27, said barrels 28 and 29 being concentric and said barrels being built up of a series of wooden slats, there being alined openings through the barrels 28 and 29, and there being a wall 30, connecting the opening in the barrel 29 to the opening in the barrel 28, thus forming the inlet-port 31 through the bag-turning cylinder to register with the inlet-port 21 in the suction-pipe at each revolution of the cylinder. The bag-turning-cylinder driving-gear 32 is formed integral with the rim 26. It is obvious that either of the barrels 28 and 29 may be formed of sheet metal or that the heads may be formed of wood and that the construction may be varied in numerous ways, the essential elements being a suction-pipe having an inlet-port, a cylinder rotatably mounted relative to the suction-pipe and having an inlet-port registering with the inlet-port of the suction-pipe at each revolution of the cylinder.

The supporting-frame comprises mating side pieces 33 and 34, said side pieces comprising bases 35, posts 36 and 37, extending upwardly from the bases, driving-shaft bearing-blocks 38, carried by the posts 37, the delivery-cylinder supporting-arms 39, extending inwardly from the posts 37, and the bag-turning-cylinder bearing-blocks 40, extending upwardly from the posts 36. Trunnions 41 extend inwardly from the inner face of each of the bearing-blocks 40, there being preferably three of said trunnions arranged radially and concentrically relative to the suction-pipe 20, and rollers 42 are mounted upon said trunnions in position to engage the outer portions of the rims 22 and 23, so as to support the bag-turning cylinder. The suction-pipe 20 is supported in the bag-delivery cylinder and does not sustain the weight of the cylinder.

In applying the staves to construct the barrel 29 a space 43 is left between the ends of the staves and the gear 32 and the outer half of the rim 27 is left bare, thus providing the angular space 44 against the end faces of the staves.

The suction-fan 45 may be mounted in any suitable position, preferably above the machine. Elbows 46 and 47 are placed upon the ends of the suction-pipe 20. Pipes 48 and 49 extend upwardly from the elbows 46 and 47. An elbow 50 is applied to the upper end of the pipe 48. A T 51 is applied to the upper end of the pipe 49. A pipe 52 connects the elbow 50 to the T 51, and a pipe 53 connects the T 51 to the suction-fan. The pipe-section 20 is loosely mounted in the elbows 46 and 47, so that it may be rotated.

Attention is called to the fact that suction is applied to both ends of the section 20, so as to increase the velocity of the air passing through the inlet-port 21.

Figures 11, 12, 13:
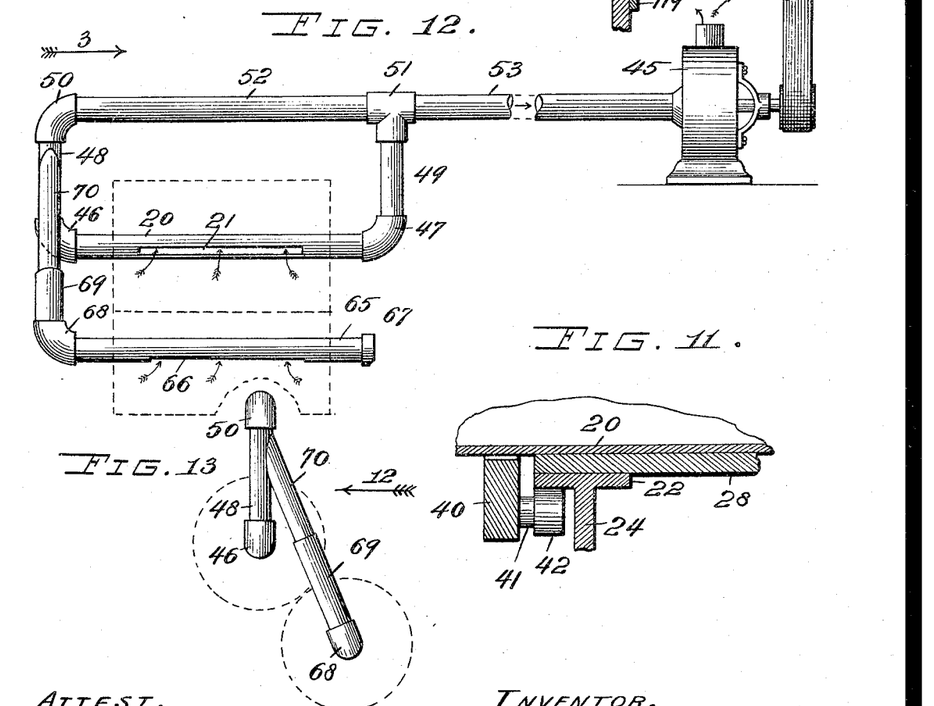
Fig. 11 is a sectional detail on the line 11 11 of Fig. 2.
Fig. 12 is a view in elevation of the suction system and looking in the direction indicated by the arrow 12 in Fig. 13.
Fig. 13 is an end elevation as seen looking in the direction indicated by the arrow 13 in Fig. 12.

It is obvious that the pipe system above described, and shown in detail in Fig. 12, might be varied in many different ways, the essentials being the fan, the pipe-section having the inlet-port, and a connection between this pipe-section and the fan.

The pipe-section 20 extends loosely through the bearing-blocks 40, so that it may not exert any pressure upon the frame except through the cylinder.

The bag-delivery cylinder is mounted in apposition to the bag-turning cylinder and comprises the inner rims 54 and 55, the webs 56 and 57, extending outwardly from the rims, the outer rims 58 and 59 around the webs 56 and 57, the inner barrel 60, extending through the rims 54 and 55 and having an opening in its side, the outer barrel 61, connecting the rims 58 and 59 and having an opening in alinement with the opening in the inner barrel, a wall 62, connecting the two openings and forming the port 63, the pressure-distributing grate 64, covering this port, the outer face of the grate being concentric with the outer face of the barrel 61. The bag-delivery suction-pipe section 65 extends through and fits closely in the barrel 60 and has an inlet-port 66 in position to register with the port 63 at each revolution of the bag-delivery cylinder. One end of the suction-pipe 65 is closed by a cap 67. An elbow 68 is loosely connected to the opposite end of the section 65. The pipe-joint 69 extends upwardly from the elbow and forms a sliding connection with the pipe-nipple 70, which is attached to the pipe 48, thus connecting the bag-delivery suction-pipe to the suction-fan 45. It is obvious that two different fans might be used, if desired, the essentials being a pipe having an inlet-port and means of establishing a continuous air-pressure toward said port. The bearing-block 71 is pivotally connected to the arm 39 at the right-hand side of the frame by the pin 72, and a similar bearing-block 73 is pivotally connected to the arm 39 at the other side of the frame by the pin 74, and the ends of the barrel 60 are rotatably mounted in said bearing-blocks, so as to support the bag-delivery cylinder. An arm 75 extends from the bearing-block 71 to a position outside of the post 36, and a retractile coil-spring 76 connects the outer end of the arm 75 to the post 36, the tension of said spring being exerted to raise the bag-delivery cylinder, and a stop 77 extends from the adjacent post 36, above the arm 75, to limit the upward motion of said arm. An arm 78 extends from the bearing-block 73 to a position outside of the other post 36. A retractile coil-spring 79 connects the outer end of said arm to this post 36, and a stop 80 limits the upward motion of the arm 78 under the tension of the spring 79. The springs 76 and 79 should be substantially equal in tension, and the stops 77 and 80 should be substantially on a level, so as to hold the bag-delivery cylinder in a position parallel with the bag-turning cylinder and in position so that the periphery of the barrel 61 is in close proximity to the periphery of the barrel 29, and the springs 76 and 79 provide a means of yieldingly mounting the barrel 61 relative to the barrel 29, so that when the bag passes between the two cylinders one cylinder may yield away from the other to the extent required to allow the bag to pass. The barrel 60, together with the wall 62, forming the port 63, may be cast integral or built up of pieces of metal, or it may be built of wood. The heads of this cylinder may be built of wood, and the barrel 61 may be of sheet metal or a casting, and various other changes may be made in the construction of this cylinder, the essentials being a suction-pipe having an inlet-port, a cylinder mounted upon the suction-pipe and having a port registering with the suction-pipe port at each revolution of the cylinder, and means of establishing a continuous air-pressure toward said port.

The bag-delivery-cylinder driving-gear 81 is formed integral with the rim 58, and in building the barrel 61 an angular space 82 is formed between the gear 81 and the end of the barrel. An angular space 83 is formed at the end of the barrel 61 around the rim 59. An adjusting-ring 84 is rigidly mounted upon the pipe-section 65 and secured against rotation by the set-screw 85. A handle 86 extends from the ring 84 to be manually engaged when it is desired to rotate the pipe-section 65 and adjust its position with reference to the port 66. An adjusting-slot 87 is formed through the bearing-block 73, and an adjusting-bolt 88 is inserted through the handle 86 and through the slot 87 to rigidly connect the ring 84 to the bearing-block and hold the port 66 in its adjusted position. The gear 81 meshes with the gear 32. The driving-shaft 89 is mounted in the bearing-blocks 38, and the driving-pinion 90 is fixed upon the driving-shaft in mesh with the gear 81, and the belt-pulley 91, fixed upon the driving-shaft, is driven from any suitable device.

Figure 6:
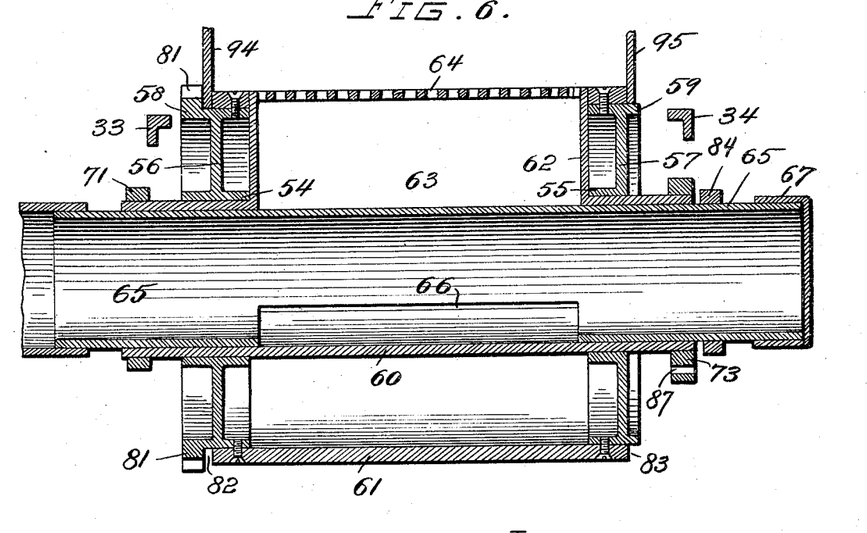
Fig. 6 is a cross-section on the lines 6 6 of Figs. 1, 2, and 3.
Figure 14:
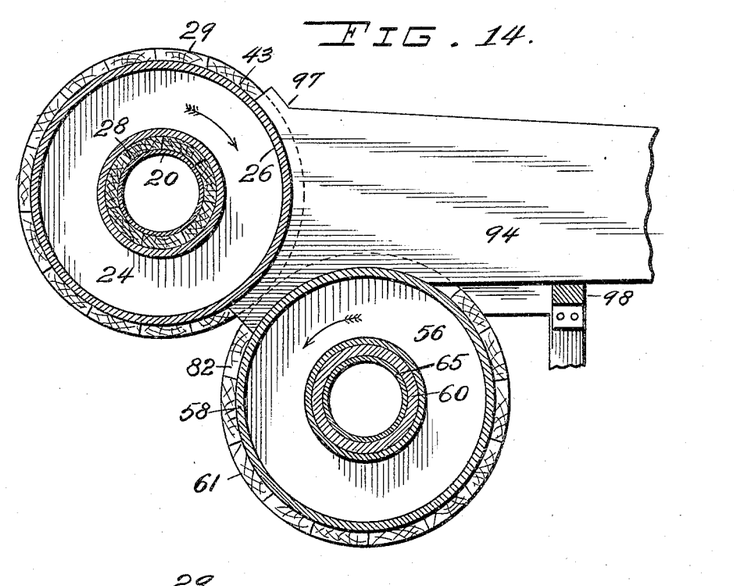
Fig. 14 is a view analogous to Fig. 2, the pipes being shown in section and the frame and gears being omitted to show the joint between the turning-box and the cylinders.

The bag-turning box comprises the rigid base portion 92 and the removable interchangeable portion 93. The base portion is mounted horizontally above the bag-delivery cylinder, the horizontal center of the box being on a level with the center of the bag-turning cylinder. The discharge end of the bag-turning box forms a close joint with the cylinders, and when the cylinders are removed relative to the box the discharge end of the box is open. The rear ends of the side pieces 94 and 95 fit in the angular spaces 43, 44, 82, and 83 and against the rims 26, 27, 58, and 59, as shown in Figs. 6 and 14. The rear end of the bottom 96 of the box fits closely against the periphery of the barrel 61, and the rear end of the top 97 of the box fits closely against the periphery of the barrel 29. The box is mounted upon the frame in any suitable way, there being a cross-piece 98 connecting the upper ends of the posts 37 to support the box. Binding-strips 99 are secured to the walls of the base 92 and against their outer faces, said strips extending beyond the ends of said walls, so as to form a socket to receive the rear end of the removable interchangeable portion 93, said portion forming an extension of the base and having a front wall 100. Set-screws 101 secure the removable section in position, so that when the machine is to be set up for a certain bag a removable section 93 is selected and placed in position corresponding to the length of the bag to be operated upon, and when the length of the bag is changed the section 93 is removed and another section substituted which will produce the length of box required. The receiving-opening 102 is formed in the center of the front wall 100, said opening being preferably diamond-shaped.

The bag-opening fingers 103 and 104 are pivotally mounted upon the finger-operating shafts 105 and 106, and said shafts are rotatably mounted in bearings 107 and 108, secured to the outer face of the side piece 95, and said shafts are mounted so as to move in opposite directions by the intermeshing gears 109 and 110. Bearing-blocks 111 and 112, which secure the fingers 103 and 104 to the shafts, are splined upon the shafts, so as to slide endwise upon the shafts, the splines holding the bearing-blocks from rotation upon the shafts, and set-screws carried by the bearing-blocks 111 and 112 hold the fingers in their adjusted positions, so that when the length of the bag-turning box-section 93 is changed the location of the fingers 103 and 104 may be correspondingly changed by manipulating the set-screws. The fingers 103 and 104 operate to and from each other at the vertical center of the bag-receiving opening 102, as clearly shown in Fig. 9. An arm 113 is fixed upon the shaft 105 and extends upwardly, and a retractile coil-spring 114 connects the upper end of the arm to the box, the tension of said spring being exerted to hold the fingers in their closed position, as shown in dotted lines in Fig. 9.

Figures 9, 10:
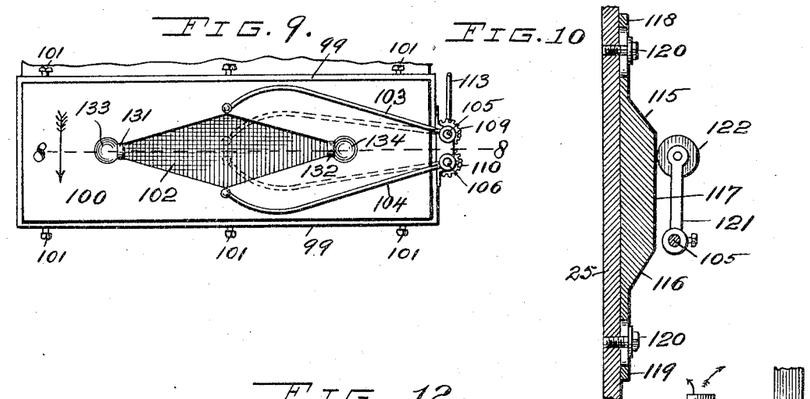
Fig. 9 is a view in elevation of the front end of the machine, the supporting-frame and other parts being omitted.
Fig. 10 is a sectional detail on the line 10 10 of Fig. 3.

The bag-opening cam comprises a block having the oppositely-inclined ends 115 and 116, the straight central portion 117, and slotted ears 118 and 119, through which lag-screws 120 are inserted and tapped into the web 25, so as to mount the cam adjustably upon the end of the bag-turning cylinder. The cam is a segment of a circle when seen in elevation, as in Fig. 3, and is located concentric to the axis of the bag-turning cylinder. A crank-arm 121 is fixed upon the end of the shaft 105 and carries a roller 122 at its upper end to engage the cam and operate the shaft 105 in opposition to the tension of the spring 114, so as to open the fingers 103 and 104, as shown in Fig. 9.

Figure 3:
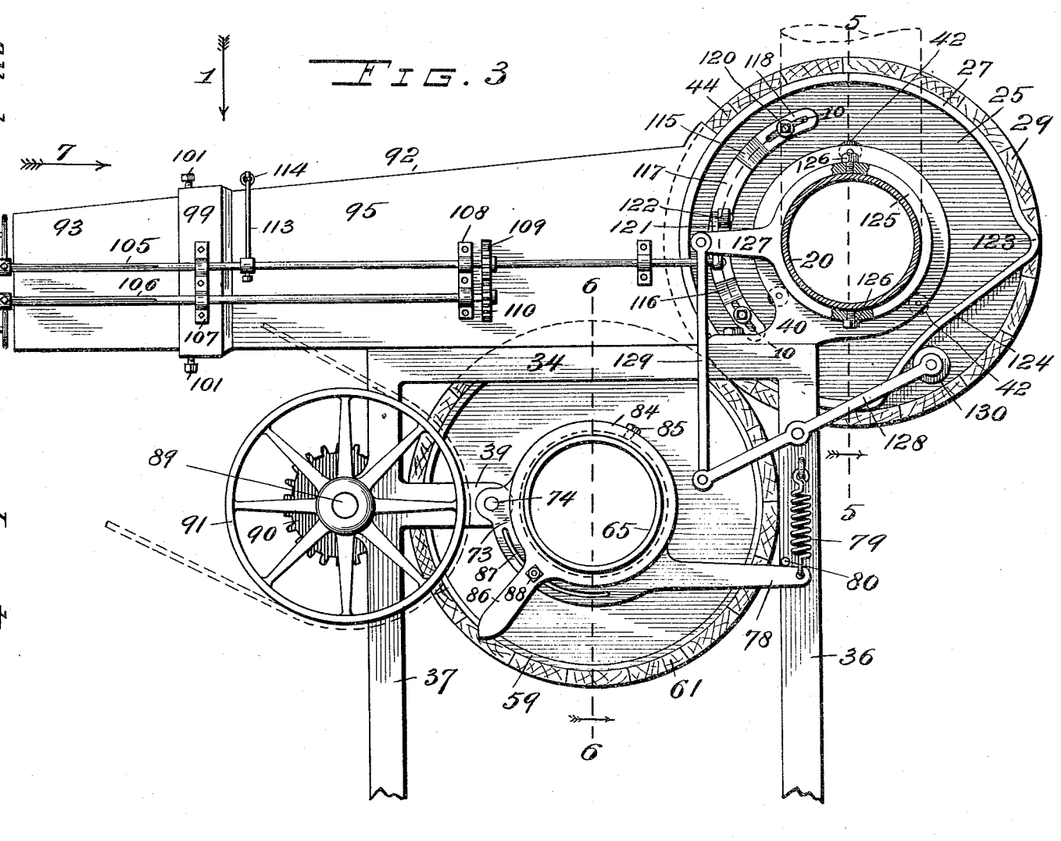
Fig. 3 is a side elevation as seen looking in the direction indicated by the arrow 3 in Fig. 1.
Figure 4:
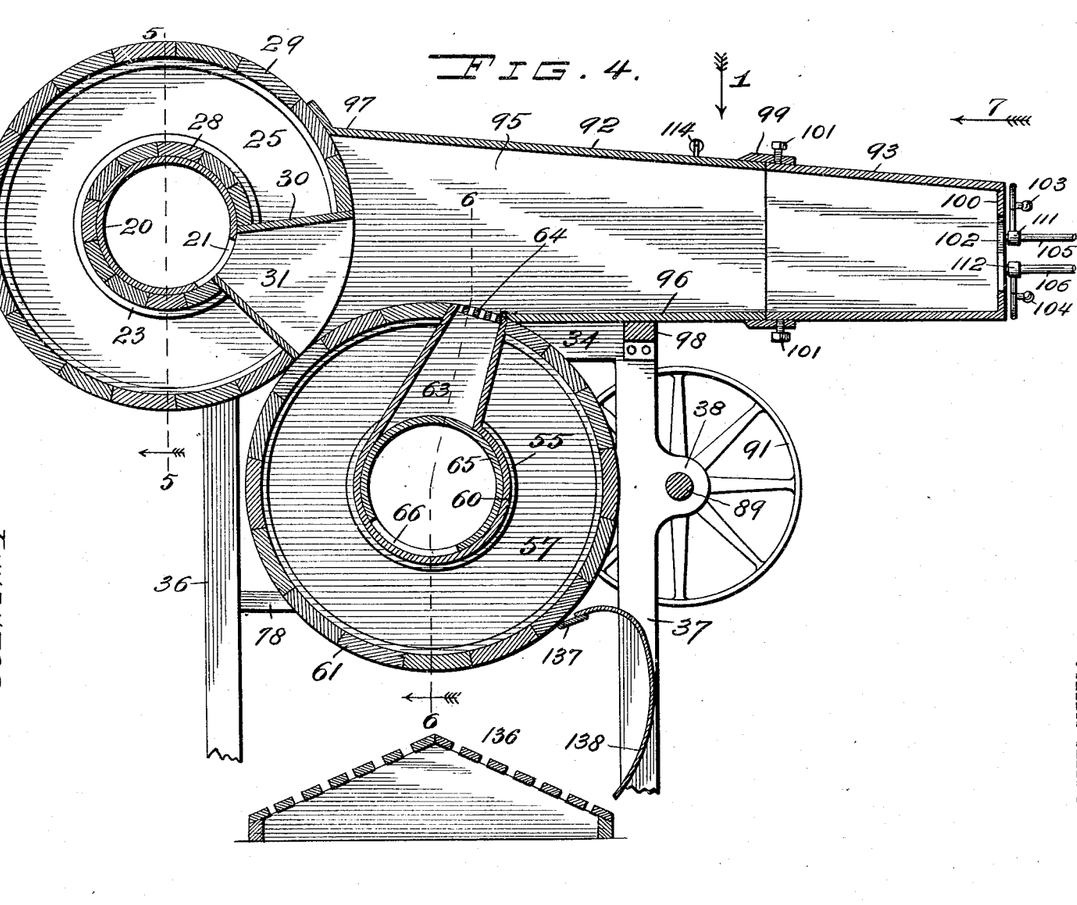
Fig. 4 is a sectional elevation on a plane parallel with Fig. 2, taken on the line 4 4 of Fig. 1 and looking in the direction indicated by the arrow.
Figure 17:
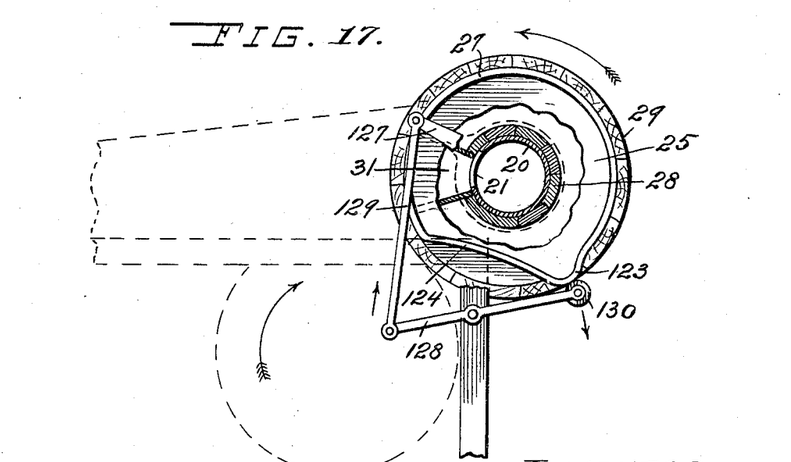
Fig. 17 is a view analogous to Fig. 3 and illustrating the quick opening-and-closing movement of the registering suction-ports.

The valve-operating cam is formed by distorting the outer part of the rim 27 to produce the projection 123, extending somewhat beyond the normal periphery of the rim, and to produce the flattened portion 124, extending within the normal periphery of the rim, as shown in Fig. 3. A ring 125 is rigidly and adjustably mounted upon the pipe-section 20 by set-screws 126, and an arm 127 extends forwardly from this ring. A lever 128 is pivoted to the post 36, and a connecting-rod 129 connects one end of the lever 128 to the outer end of the arm 127, and a roller 130, carried by the opposite end of the lever, rides upon the valve-operating cam, so that when the bag-turning cylinder is rotated in the direction indicated by the arrow in Fig. 17 and reaches a point where the port 31 is about to pass into registration with the port 21 the roller 130 will be forced outwardly by the projection 123, thus throwing the arm 127 upwardly and rotating the pipe 20 in the opposite direction from the rotation of the cylinder, thereby increasing the speed of the valve motion existing between the cylinder and the pipe and making a quick opening of the air-current. Then the roller 130 will pass along the flattened portion 124, thus rotating the pipe-section 20 in the same direction that the cylinder is rotated until the roller 130 again approaches the normal periphery of the rim 27, and as the roller passes from the flattened portion 124 to the normal periphery the pipe-section 20 is again rotated in the opposite direction to the rotation of the cylinder, thereby causing a quick cut-off of the air-current, as shown in Figs. 3 and 17.

As before suggested, the receiving-opening 102 in the front wall of the bag-turning box is diamond-shaped, the longest dimension of the diamond being horizontal. It is important that this opening be large enough to allow the bag to pass through it as it is turned and that it be small enough to be completely covered by the open end of the bag before it is turned. The fingers 103 and 104 operate at the shortest or vertical dimension of the diamond. Hand-supports 131 and 132 extend forwardly at the ends of the opening, and knuckle-recesses 133 and 134 are formed in the wall 100 immediately outside of the supports 131 and 132.

Figure 7:
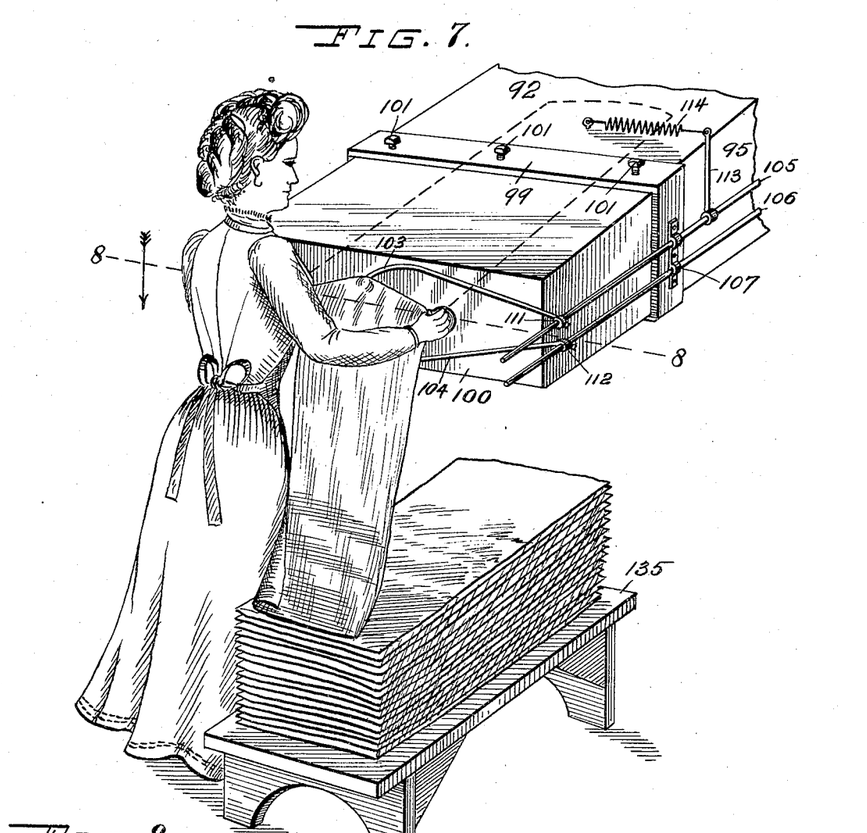
Fig. 7 is a perspective of the front end, illustrating the operation and looking in the direction indicated by the arrow 7 in Figs. 1 and 8.
Figure 8:
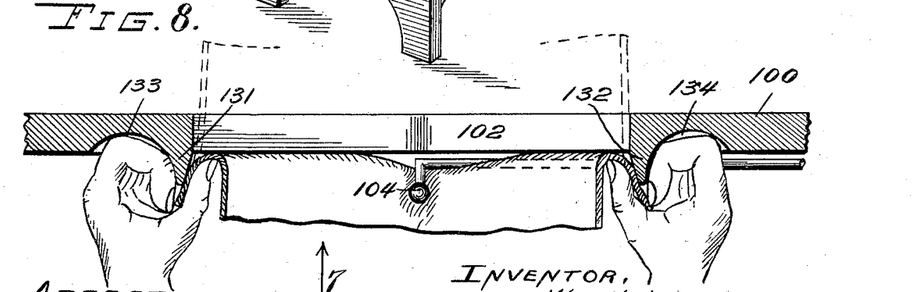
Fig. 8 is a horizontal sectional detail on the line 8 8 of Figs. 7 and 9 and looking downwardly, as indicated by the arrow.
Figure 15:
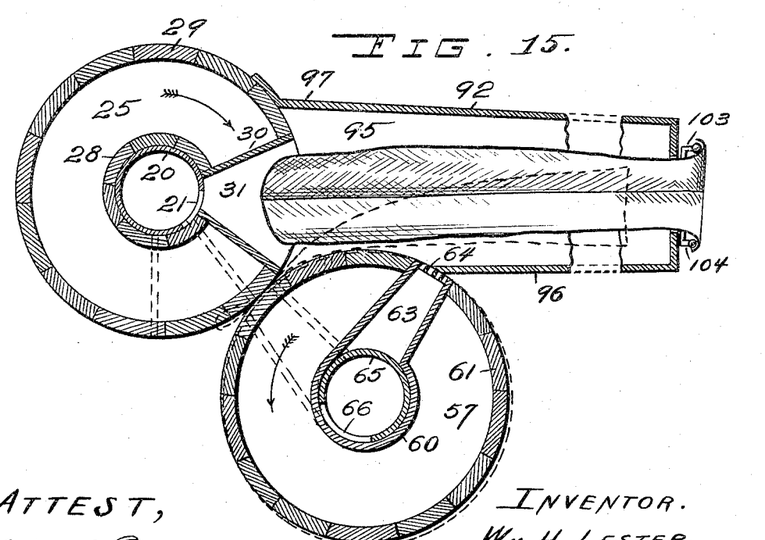
Fig. 15 is a view analogous to Fig. 4 and illustrating the operation of turning a bag.
Figure 16:
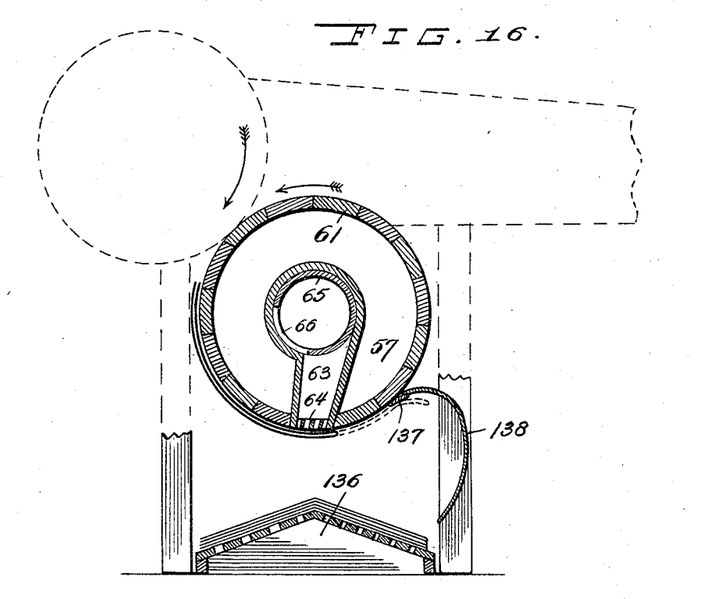
Fig. 16 is a view analogous to Fig. 15 and illustrating the operation of delivering the turned bag.

The upturned bags may be piled upon a bench 135 in a position convenient to the operator, who stands in front of the bag-turning box, as shown in Fig. 7. The flattened open end of the bag is grasped by the operator and placed in position to cover the opening 102, with the knuckles of the operator's hands in the recesses 133 and 134, with the fingers 103 and 104 in the bag-opening, and with the edges of the bag clasped against the supports 131 and 132 by the thumbs of the operator, said supports serving to hold the operator's hands from being drawn together into the opening 102 by the air-pressure turning the bag. Then the roller 122 will ride upon the cam-surface 116, thus rocking the shafts 105 and 106 and moving the fingers 103 and 104 to their open positions, thereby opening the mouth of the bag, and the mouth is held open while the roller 122 travels along the surface 117. During this time the port 31 is in registration with the port 21, and the air-current, caused by the suction-fan, will draw the bag through the opening 102 and through its own mouth, thereby turning the bag into the bag-turning box, as shown in Fig. 15. The bag-turning box must be long enough so that the closed end will pass only slightly into the port 31, and the box must be long enough so that the closed end of the bag will not pass too far into the port 31. Then as the cylinders continue to rotate the port 31 passes out of registration with the port 21, the wall of the port 31 presses the closed end of the bag downwardly upon the bag-delivery cylinder, and then the operator releases the bag and it is drawn between the two cylinders, as shown in dotted lines in Fig. 15. At the time that the closed end of the bag is passing between the two cylinders the bag is pressed against the bag-delivery cylinder in contact with the grate 64, the port 63 is in registration with the port 66, and the air-pressure caused by the suction-fan presses the bag against the grate 64, and the bag is carried around to a point directly below the axis of this bag-delivery cylinder. Then the port 63 passes out of registration with the port 66, the air-pressure is checked, and the bag is dropped upon the receiver 136, as shown in Fig. 16. A scraper 137 is attached at its ends to the frame, so that the scraper will contact with the periphery of the bag-delivery cylinder at a point just beyond where the air-pressure is cut-off, so that if the cylinder is going at a high rate of speed and the bag does not drop the scraper will remove the bag from the cylinder, and the guide 138 is connected to the scraper and curved outwardly and downwardly, so as to guide the bag down upon the receiver 136.

The continuous action of the suction-fan creates a continuous rarefaction of the air in the pipe system, thereby causing a continuous air-current to pass through the bag-turning box-opening 102, through the box, through the port 31 in the periphery of the bag-turning cylinder, through the port 21 in the bag-turning suction-pipe, and through the pipe system to the fan, the force of said current being always present in the pipe system and always present in the bag-turning box except when the port 31 is out of registration with the port 21. In other words, I produce a continuous current and provide means of interrupting and controlling the current. The result would be the same if a blow-fan was placed in position and connected to the receiving end of the bag-turning box so as to blow continuously through the machine. The action of the suction-fan also creates a vacuum or rarefaction of the air in the bag-delivery pipe 65, so that when the port 63 is in registration with the port 66 there is a continuous air-pressure directed toward the mouth of the port 63, said pressure being distributed evenly over said mouth by the grate 64. The force causing this pressure is always present in the pipe 65; but its action is interrupted when the port 63 is out of registration with the port 66.

The bag-turning cylinder having a port 31 in its periphery performs two main functions. In the first place it regulates the air-current and performs the function of a valve motion to shut off and turn on the air-current at regular intervals, as desired, to turn the bag by the force of the air-current, and in the second place the port 31 in the priphery of the bag-turning cylinder receives the closed end of the turned bag, grasps the bag, and presses it against the bag-delivery cylinder. It is essential that some means be provided to take hold of the turned bag before it is released by the operator and then handle and deliver the bag out of the machine. The bag-turning cylinder is one means that may be employed for this purpose. It is obvious that other forms of delivery mechanism might be used in connection with the bag-turning cylinder. The principal function of the bag-turning cylinder is to receive the turned bag, carry it out of the bag-turning box, and deliver it upon the bag-receiver, and it is obvious that this delivery-cylinder might be used in connection with other forms of bag-turning mechanism. It is important that the two cylinders be yieldingly mounted relative to each other, and while I prefer to mount the bag-delivery cylinder yieldingly it is obvious that the bag-turning cylinder might be yieldingly mounted and the bag-delivery cylinder rigidly mounted, or that both cylinders might be yieldingly mounted. This is important, because a bag might become wadded or doubled in the bag-turning box, and then it would be necessary for the cylinders to spring apart in order to allow the bag to pass in its disordered condition. Ordinarily the yielding motion will only be slight, and the gears connecting the two cylinders will not be thrown out of mesh.

In regard to the bag-turning box it is important that means be provided for changing the size of the box when it is desired to operate upon different sizes of bags. When a change is made from one size of bag to another, the length of the box must be changed and the size of the receiving-opening in the front wall of the box must be changed. Means must be provided for changing the front wall of the box in some manner, so as to enlarge or reduce the size of the opening 102. I prefer to make a separate front section of the box for each size of bag, making said sections interchangeable and readily removable, so that in changing the work from one size of bag to another it is only necessary to take off one section of box and put on another. The essentials are a box having means of being adapted to different lengths of bags and having means of providing a receiving-opening for different sizes of bags.

It is important that means be provided for positively grasping the turned bag and pulling it away from the operator. By a little practice the operator will become accustomed to the amount of exertion required and will hold onto the bag with sufficient force to resist the air-current, and when the delivery mechanism takes hold of the bag the bag will be pulled away from the operator. This is the best way of timing the motions of the operator. If the operator depends upon a mental process for releasing the bag, the bag might be released too quick and drawn into the bag-turning cylinder, or it might not be released quick enough, and in either event the operation would be a failure; but when the operator holds the bag with just sufficient force to overcome the air-current and the machinery takes hold of the bag and pulls it away from the operator there can be no mistake in the time of the action.

It is important that means be provided for adjusting the delivery mechanism to different lengths of bags. The delivery suction-pipe is mounted rotatably and adjustably, so that the point at which the port 63 passes out of registration with the port 66 may be changed. If a short bag is being worked, the adjustment will be fixed so as to shut off the air-pressure some time before the grate 64 reaches the scraper 137, as shown in Fig. 16, and if desired to change to another bag the adjustment will be changed so as to cut off the air-pressure at a point nearer to the scraper. The exact point at which the air-pressure takes hold of the bag is not very material.

Thus it will be seen that I provide a rotary cylinder having a port in its periphery, establish an air-current directed toward said port, provide means of inserting the unturned bag into the path of said air-current, provide means of grasping the turned bag from the operator's hand, provide a movable delivery mechanism, establish an air-pressure toward said mechanism, and provide means of bringing the turned bag under the influence of the air-pressure, and provide means of releasing the turned bag from the delivery mechanism.

It is obvious that the machine shown or similar mechanism constructed in accordance with the principles herein disclosed may be adapted to the turning of other articles, and I therefore do not wish to limit the use of my invention to the turning of bags.

I claim—

1. In a turning-machine: a movable member having an air-port; means of establishing a continuous air-current toward said port; and means of inserting the unturned article into the path of said air-current; substantially as specified.

2. In a turning-machine: a rotary cylinder having an air-port in its periphery; and means of establishing a continuous air-current directed to said port; substantially as specified.

3. In a turning-machine: a movable member having an air-port; means of establishing a continuous air-current directed to said port; a second movable member having an air-port; a pressure-distributing grate in the air-port of said second movable member; and means of establishing an air-pressure directed toward said grate; substantially as specified.

4. In a turning-machine: a rotary cylinder having an air-port in its periphery; means of establishing a continuous air-current directed toward said port; a second rotary cylinder having an air-port in its periphery; a grate over the port of the second rotary cylinder; and means of establishing an air-pressure toward said grate; substantially as specified.

5. In a turning-machine: means of establishing an air-pressure; a delivery mechanism; and means of bringing the turned article under the influence of the air-pressure upon the delivery mechanism; substantially as specified.

6. In a turning-machine: a movable delivery mechanism; and means of establishing an air-pressure for holding the turned article upon the delivery mechanism; substantially as specified.

7. In a turning-machine: a movable delivery mechanism; means of establishing an air-pressure for holding the turned article upon the delivery mechanism; and means of interrupting the air-pressure to release the article; substantially as specified.

8. In a turning-machine: a rotary cylinder having a port in its periphery; means of establishing an air-current toward said port; and means of bringing the unturned article into the path of said air-current; substantially as specified.

9. In a turning-machine: a rotary cylinder having a port in its periphery adapted to receive the closed end of the turned article; and means of establishing an air-current directed toward said port; substantially as specified.

10. In a turning-machine: a rotary cylinder having a port in its periphery adapted to receive the closed end of the turned article; a second cylinder in apposition to the first cylinder and adapted to receive the turned article from said port; substantially as specified.

11. In a pneumatic bag-turning machine: a bag-turning suction-pipe having an inlet-port; a bag-turning cylinder rotatably mounted relative to the suction-pipe and having an inlet-port in its periphery adapted to register with the pipe-inlet port at each revolution of the cylinder; means of establishing an air-current directed toward said ports; and means of inserting the unturned bag into the path of said air-current; substantially as specified.

12. In a pneumatic bag-turning machine: a bag-turning suction-pipe having an inlet-port; a bag-turning cylinder rotatably mounted relative to the suction-pipe and having an inlet-port in its periphery and adapted to register with the pipe-inlet port at each revolution of the cylinder; a bag-turning box in position to discharge into said ports when they are registered, and having a receiving-opening through which the bag is turned; and means of directing an air-current toward said receiving-opening; substantially as specified.

13. In a pneumatic bag-turning machine; a bag-turning suction-pipe having an inlet-port; a bag-turning cylinder having an inlet-port in its periphery to register with the first inlet-port; and a connection between the suction-pipe and the cylinder, whereby the suction-pipe is rotated to hasten the registration of said ports; substantially as specified.

14. In a pneumatic bag-turning machine: a bag-turning suction-pipe having an inlet-port; a bag-turning cylinder having an inlet-port in its periphery to register with the first inlet-port; and a connection between the suction-pipe and the cylinder, whereby the suction-pipe is rotated to hasten the closing of said ports; substantially as specified.

15. In a pneumatic bag-turning machine: a bag-turning suction-pipe having an inlet-port; a bag-turning cylinder having an inlet-port in its periphery to register with the first inlet-port; and a connection between the suction-pipe and the cylinder, whereby the suction-pipe is rotated to hasten the registration of said ports, and whereby the suction-pipe is rotated to hasten the closing of said ports; substantially as specified.

16. In a pneumatic bag-turning machine; a bag-turning box having interchangeable receiving ends adapted for different sizes and lengths of bags; substantially as specified.

17. In a pneumatic bag-turning machine: a bag-turning cylinder rotatably mounted; a bag-turning suction-pipe extending through the cylinder, held adjustably against rotation and supported by the cylinder; substantially as specified.

18. In a turning-machine: a movable member having an air-port; means of opening and closing the air-port; means of establishing an air-current toward said port; and means of inserting the unturned article into the path of said air-current; substantially as specified.

19. In a turning-machine: a movable member having an air-port; means of opening and closing said port at regular intervals; means of establishing an air-current toward said port; and means of inserting the unturned article into the path of said air-current; substantially as specified.

20. In a turning-machine: a rotary cylinder having an air-port in its periphery; means of opening and closing said port; and means of establishing an air-current toward said port; substantially as specified.

21. In a turning-machine: a rotary cylinder having an air-port in its periphery; quick-acting means of opening and closing said port; and means of establishing an air-current toward said port; substantially as specified.

22. In a turning-machine: a movable member having an air-port; means of opening and closing said air-port; means of establishing an air-current toward said port; a second movable member having an air-port; a pressure-distributing grate in the air-port of the second movable member; means of opening and closing the air-port of said second movable member; and means of establishing an air-pressure directed toward said port; substantially as specified.

23. In a turning-machine: a movable member having an air-port; means of opening and closing said air-port quicker than the motion of the movable member; means of establishing an air-current directed toward said port; a second movable member having an air-port; means of adjusting peripherally the air-port of said second movable member; a pressure-distributing grate in the air-port of said second movable member; and means of establishing an air-pressure directed toward said port; substantially as specified.

24. In a turning-machine: a rotary cylinder having an inlet-port in its periphery and an outlet-port in its end; means of establishing an air-current directed toward said port; and means of inserting an unturned bag into the path of said air-current; substantially as specified.

25. In a turning-machine: a rotary cylinder having an inlet-port in its periphery and an outlet-port in its end; means of opening and closing the inlet-port quicker than the rotation of the cylinder; and means of establishing an air-current toward said inlet-port; substantially as specified.

26. In a turning-machine: a rotary cylinder having an inlet-port in its periphery and an outlet-port in its end; means of establishing an air-current toward said inlet-port; a second rotary cylinder having an inlet-port in its periphery and an outlet-port in its end; a grate over the inlet-port of the second rotary cylinder; and means of establishing an air-pressure toward said grate; substantially as specified.

27. In a turning-machine: means of turning an article; means of establishing an air-pressure; a delivery mechanism; means of bringing the article under the influence of the air-pressure upon the delivery mechanism; and means of cutting off the air-pressure to release the article; substantially as specified.

28. In a turning-machine: means of turning an article; means of establishing an air-pressure; a delivery mechanism; means of bringing the article under the influence of the air-pressure upon the delivery mechanism; and means of making and breaking the air-pressure at certain points; substantially as specified.

29. In a turning-machine: means of establishing an air-pressure; a delivery mechanism; means of bringing the article under the influence of the air-pressure upon the delivery mechanism; means of making and breaking the air-pressure at certain points; and means of adjusting said points peripherally; substantially as specified.

30. In a turning-machine: a movable delivery mechanism; means of causing an air-pressure for holding the article upon the delivery mechanism; and means of turning the article before it reaches the delivery mechanism; substantially as specified.

31. In a turning-machine: a movable delivery mechanism; means of causing an air-pressure for holding the article upon the delivery mechanism; and rotary means of turning the article before it reaches the delivery mechanism; substantially as specified.

32. In a turning-machine: a movable member having an inlet-port; a suction-fan connected to said inlet-port; and means of bringing the unturned article under the influence of the suction-fan; substantially as specified.

33. In a turning-machine: a rotary cylinder having an inlet-port in its periphery; and a suction-fan connected to said inlet-port; substantially as specified.

34. In a turning-machine: a movable member having an inlet-port; a suction-fan connected to said inlet-port; and a second movable member having an inlet-port; said second inlet-port being also connected to the suction-fan; substantially as specified.

35. In a turning-machine: a rotary cylinder having an inlet-port in its periphery; a second rotary cylinder having an inlet-port in its periphery; and a suction-fan connected to both of said ports; substantially as specified.

36. In a turning-machine: a rotary cylinder having an inlet-port in its periphery and an outlet-port in its end; a second rotary cylinder having an inlet-port in its periphery and an outlet-port at its outer end; a grate over the port of the second rotary cylinder; and a suction mechanism for establishing an air-current toward the inlet-port of the first cylinder and an air-pressure toward said grate; substantially as specified.

37. In a turning-machine: a turning-box; a suction mechanism connected to the turning-box; a delivery mechanism; and means of bringing the article under the influence of the suction mechanism upon the delivery mechanism; substantially as specified.

38. In a turning-machine: turning mechanism; a movable delivery mechanism to receive the article from the turning mechanism; and a suction mechanism for holding the article upon the delivery mechanism; substantially as specified.

39. In a turning-machine: a turning mechanism; a movable delivery mechanism connected to the turning mechanism; a suction mechanism for holding the article upon the delivery mechanism; and means of interrupting the suction mechanism; substantially as specified.

40. In a turning-machine: a rotary cylinder having a port in its periphery; a suction-fan for establishing an air-current toward said port; and means of bringing the unturned article in the path of the air-current; substantially as specified.

41. In a turning-machine: a rotary cylinder having a port in its periphery adapted to receive the closed end of the turned article; and a suction-fan connected to said port; substantially as specified.

42. In a turning-machine: a rotary cylinder having an inlet portion in its periphery adapted to receive the closed end of the turned article; and a second rotary cylinder in proximity to the first cylinder and adapted to receive the turned article from said port; substantially as specified.

43. In a turning-machine: a rotary cylinder having a port in its periphery adapted to receive the closed end of the turned article; a second cylinder in proximity to the first cylinder and having an inlet-port in its periphery; a pressure-distributing grate in said inlet-port of the second cylinder; said grate being in position to receive the turned article from the first cylinder; and a suction-fan for drawing the closed end of the turned article into the first cylinder and for pressing the turned article against the second cylinder; substantially as specified.

44. In a pneumatic bag-turning machine: a bag-turning suction-pipe having an inlet-port; a bag-turning cylinder rotatably mounted relative to the suction-pipe and having an inlet-port in its periphery adapted to register with the pipe inlet-port at each revolution of the cylinder; a suction-fan for establishing an air-current directed toward said ports; and means for holding the unturned bag into the path of said air-current; substantially as specified.

45. In a pneumatic bag-turning machine: a bag-turning suction-pipe having an inlet-port; a bag-turning cylinder rotatably mounted relative to the suction-pipe and having an inlet-port in its periphery and adapted to register with the pipe inlet-port at each revolution of the cylinder; a bag-turning box in position to discharge into said ports when they are registered, and having a receiving-opening through which the bag is turned; and a suction-fan for establishing an air-current through said receiving-opening; substantially as specified.

46. In a pneumatic bag-turning machine; a bag-turning suction-pipe having an inlet-port; a bag-turning cylinder having an inlet-port in its periphery to register with the first inlet-port; a connection between the suction-pipe and the cylinder, whereby the suction-pipe is rotated to hasten the registration of said ports; and a suction-fan connected to the suction-pipe; substantially as specified.

47. In a pneumatic bag-turning machine: a bag-turning suction-pipe having an inlet-port; a bag-turning cylinder having an inlet-port in its periphery to register with the first inlet-port; a connection between the suction-pipe and the cylinder, whereby the suction-pipe is rotated to hasten the closing of said ports; and a suction-fan connected to the suction-pipe; substantially as specified.

48. In a pneumatic bag-turning machine: a bag-turning suction-pipe having an inlet-port; a bag-turning cylinder having an inlet-port in its periphery to register with the first inlet-port; a connection between the suction-pipe and the cylinder, whereby the suction-pipe is rotated to hasten the registration of said ports, and whereby the suction-pipe is rotated to hasten the closing of said ports; and a suction-fan connected to the suction-pipe; substantially as specified.

49. In a turning-machine: means of establishing an air-pressure; a delivery mechanism; means of bringing the turned article under the influence of the air-pressure upon the delivery mechanism; and a scraper for removing the article substantially as specified.

50. In a turning-machine: a movable delivery mechanism; means of establishing an air-pressure for holding the turned article upon the delivery mechanism; and a scraper for removing the article; substantially as specified.

51. In a turning-machine: a rotary cylinder having a port in its periphery adapted to receive the closed end of the turned article; a second cylinder in opposition to the first cylinder and adapted to receive the turned article from said port; and a scraper to remove the article from the second cylinder; substantially as specified.

52. In a pneumatic bag-turning machine: a bag-turning box; two shafts rotatably mounted outside of the box and geared together; bag-opening fingers mounted upon the shafts in front of the receiving-opening of the bag-turning box; and means of operating one of the shafts; substantially as specified.

53. In a pneumatic bag-turning machine: a bag-turning cylinder; a bag-turning box mounted in operative relation to the cylinder; two shafts mounted upon the side of the box and connected together to operate in opposite directions; means of operating the shafts from the bag-turning cylinder; and bag-opening fingers mounted upon the bag-turning shaft in front of the receiving-opening of the bag-turning box; substantially as specified.

54. In a pneumatic bag-turning machine: a bag-turning box having a receiving-opening; fingers operating vertically across said opening; and handholds at the sides of said opening; substantially as specified.

In testimony whereof I have signed my name to this specification in presence of two subscribing witnesses.

WILLIAM H. LESTER.

Witnesses:
S. G. WELLS,
M. M. BRAZILL.